July 5, 1966     D. R. HILLIER ETAL     3,259,124

CATHETER TRANSDUCER FOR IN VIVO MEASUREMENTS

Filed July 19, 1963     2 Sheets-Sheet 1

*INVENTORS*
DOUGLAS R. HILLIER
BY HENRY FAIGH
BOYD W. COON

ATTORNEY

July 5, 1966  D. R. HILLIER ETAL  3,259,124
CATHETER TRANSDUCER FOR IN VIVO MEASUREMENTS
Filed July 19, 1963  2 Sheets-Sheet 2

INVENTORS
DOUGLAS R. HILLIER
HENRY FAIGH
BOYD W. COON
BY
ATTORNEY

3,259,124
CATHETER TRANSDUCER FOR IN VIVO MEASUREMENTS
Douglas R. Hillier, Palo Alto, Henry Faigh, Sunnyvale, and Boyd W. Coon, Berkeley, Calif., assignors to Beckman Instruments, Inc., a corporation of California
Filed July 19, 1963, Ser. No. 296,250
6 Claims. (Cl. 128—2.1)

This invention relates to an electrochemical transducer for measuring a constituent in a sample, and, in particular, to such a transducer for making in vivo measurements of a constituent in a body fluid or the tissue of a human or animal.

It is the conventional practice to measure a constituent in a body fluid, such as the measurement of oxygen tension or the partial pressure of oxygen in blood, by withdrawing a sample of the body fluid from the subject being examined by means of a catheter and then determining the constituent in the fluid externally of the subject. In the case of the measurement of the oxygen tension in blood, the Van Slyke analysis is used. This obviously is a time consuming method and the body fluid being analyzed externally of the subject from which it is taken does not necessarily maintain its exact characteristics as in the living body. For example, the temperature of blood taken from a subject must be closely regulated so as to be equivalent to the body temperature of the subject being examined. What is needed then is a method and means by which a constituent in body fluid or tissue of a living subject such as the oxygen tension of blood within the chambers of the heart, arteries, veins may be measured instantaneously, that is, without the withdrawal of the fluid from the body.

It is, therefore, the principal object of the present invention to provide a means for making rapid and accurate in vivo measurements of a constituent in a body fluid or tissue without requiring the withdrawal of the fluid from the subject being examined.

Another object of the invention is to provide an electrochemical transducer in a catheter adapted to be inserted into a living body to measure a constituent in a fluid or tissue within the body, which transducer is not influenced by electrical fields within the body.

A further object of the present invention is to provide a device for making in vivo measurements of a constituent in a fluid within a living subject and for simultaneously withdrawing said fluid from the subject for additional analysis.

According to the principal aspect of the present invention, a miniaturized electrochemical sensor is positioned in an elongated flexible tube of very small diameter, generally referred to as a catheter, with electrical conductors extending through the tube connecting the electrodes of the electrochemical sensor to a connector at the other end of the tube which is adapted to be connected to an external circuit. Means are provided for protecting the sensing electrode of the electrochemical sensor from the various electrical fields inside the body whereby accurate measurements of the oxygen tension or other characteristics of fluids within the body may be made.

According to another aspect of the invention, an opening is provided in the catheter tubing for withdrawing body fluid from a position near the electrochemical sensor at the forward end of the tubing and for permitting the flow of the fluid to the rear end of the tubing, externally of the subject being examined, whereby pressure pulses may be transmitted to an external transducer or the fluid may be subjected to further analysis.

Other objects, aspects and advantages will become apparent from the following description taken in connection with the accompanying drawings therein:

Figure 1:
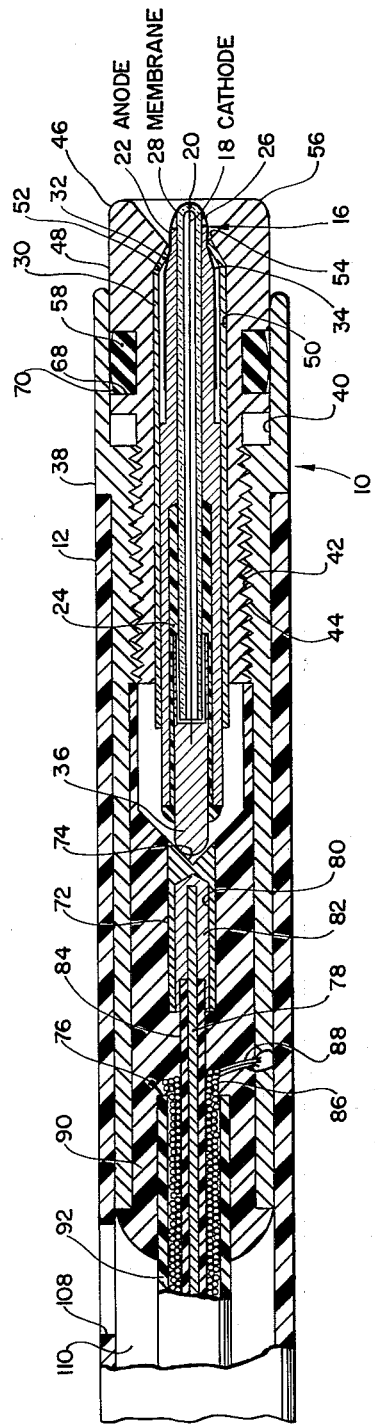
FIG. 1 is a greatly enlarged cross sectional view of the electrochemical sensor assembly of the invention connected to the forward portion of a catheter.

The present invention will be described as a heart catheter having an electrochemical sensor assembly for measuring the oxygen tension or partial pressure of oxygen in the heart of a living person or animal. However, it should be understood that any type of electrochemical sensing device may be used in the invention, as will be explained later in detail, and that the device may be inserted not only in the heart of a living subject but into the veins, arteries and in the cardiovascular system of a subject. The system may also be advantageously used in newborn babies for the detection of septal defects, cyanosis, and other cardiac defects. More broadly, the invention may be used in any situation in which an extremely small passage is permitted for the insertion of an electrochemical sensing device and where it is desired to measure a constituent in a particular fluid sample in situ.

Referring now to the drawings in detail, there is shown an electrochemical sensor assembly generally designated by numeral 10 connected at the forward end of an elongated flexible tube or catheter 12 which receives at its rear end a connecting device 14 (seen in FIG. 3) for connecting the sensor assembly to an external circuit (not shown). The electrochemical sensor assembly 10 receives an electrode assembly 16 which is shown as being a miniaturized polarographic electrode device of the type described in detail in patent application Serial No. 791,752, filed February 6, 1959, entitled "Electrode," now Patent No. 3,098,813, assigned to the assignee of the present application.

The electrode assembly 16 comprises a central platinum wire cathode 18 surrounded by a glass sleeve 20. The platinum wire extends through the forward end of the glass sleeve leaving an exposed surface which is flush with the surface of the glass. A silver anode 22 in the form of a cylindrical tube covers the forward portion of the glass sleeve 20 and is spaced from the rear portion of the glass sleeve providing an annular passage which is filled with a nonconducting epoxy potting material 24. The forward portion of the anode 22 is spaced slightly rearwardly of the forward part of the glass sleeve 20 to provide an annular space or reservoir 26 for containing electrolyte which forms a bridge between the two electrodes. A membrane 28 is disposed over the forward ends of the two electrodes, the sleeve 20 and the electrolyte reservoir 26 to separate the electrodes and electrolyte from the sample in which the instrument is placed for analysis purposes.

For the analysis of the oxygen content of blood, the membrane may be polyethylene, this material being oxygen permeable and transmitting the oxygen to the interior of the electrode assembly while forming a barrier to other substances which would affect the electrical characteristics of the assembly. Other materials suitable for use as membranes are polyvinyl chloride, tetrafluoroethylene and polypropylene. For oxygen measurement, it has been found that sodium and potassium chloride solutions are quite suitable as electrolytes with a silver reference electrode. Alternatively, any of a variety of suitable buffer solutions could be used. Moreover, various other materials other than silver and platinum could also be used for the electrodes 18 and 22 as is well known in the art.

In operation of the electrode assembly 16, the electrolyte provides for the flow of electrons in the electro-reduction and electro-oxidation processes used in polarography. For example, in the determination of oxygen content of an alkaline sample, oxygen diffusing through the membrane 28 is reduced at the platinum sensing electrode 18 according to the reaction:

$$O_2 + 2H_2O + 2e^- \rightarrow H_2O_2 + 2OH^-$$

also $$O_2 + 2H^+ + 2OH + 4e^- \rightarrow 4OH^-$$

In acid media, the reaction may be written as:

$$O_2 + 2H^+ + 2e^- \rightarrow H_2O_2$$

Thus, the electrical characteristics of the electrode assembly will be affected in proportion to the quantity of the oxygen which passes through the membrane. The current transversing the electrodes will vary in direct proportion to the quantity of oxygen striking the platinum cathode, the cell being polarized at the predetermined applied voltage (0.7 volt) in the absence of oxygen and being depolarized when oxygen is present to be reduced at the cathode.

The electrode assembly also includes a steel cylindrical sleeve 30 which is positioned over the cylindrical anode 22 for the purpose of holding the membrane 28 in position. A frustroconical end 32 is preferably formed on the sleeve corresponding to a conical section 34 on the anode 22. The membrane is clamped between the section 34 and end 32, which structure maintains the membrane in position, engaged with the end of the glass sleeve 20 and the exposed face of the platinum cathode 18.

At the rear portion of the electrode assembly 16 there is provided a Phosphor bronze pin 36 which is electrically connected to the end of the platinum cathode 18. The epoxy material 24 in the rear portion of the anode 22 also serves to support the pin 36 and provides insulation between these two members.

The electrode assembly 16 may be made very small. For example, the electrode assembly of the invention has been made .310 inch in length and approximately .031 inch at the widest diameter. In such assembly, an .001 inch diameter platinum cathode wire was utilized in the center of an .013 inch outer diameter piece of glass tubing 20. The polyethylene membrane 28 covering the electrodes was 1 mil thick.

The electrochemical sensor assembly 10 connected to the catheter tubing 12 includes, besides the electrode assembly 16, a housing 38 having a recess 40 in its forward end and a screw threaded recess 42 which receives the screw threaded portion 44 of a cap member 46. The cap member has an enlarged forward portion 48 slidably positioned in the recess 40 of the housing 38. A cylindrical passage 50 in the cap member 46 receives the electrode assembly 16 and steel sleeve 30. The forward portion of this passage 50 is conically shaped at 52 to cooperate with the frustroconical portion 32 of the sleeve 30. Thus, when the cap member 46 is screwed into the threaded recess 42 of the housing 38, the conical portion 52 of the cap member will urge the frustroconical section of the steel sleeve 30 against the membrane 28 to ensure that the membrane is firmly secured into the assembly.

The forward portion of the cap 46 is provided with an opening 54 through which the forward portions of the anode 22, cathode 18 and the membrane 28 extend for contact with the sample being analyzed. An annular portion 56 on the cap surrounds the forward portion of the electrode assembly 16 and extends slightly beyond the end of the assembly to protect the membrane from contacting the walls of the artery or vein through which the instrument is passed or any other surfaces. An annular ring 58 of resilient material such as rubber is positioned in an annular groove 68 in the outer surface of the enlarged portion 48 of the cap member. The ring is essentially "D" shaped in cross section and provides a curved outer surface 70 which bears against the surface of the recess 40 in the housing 38. This resilient annular ring both prevents the entrance of any moisture into the electrochemical sensor assembly 10 and serves to prevent the unthreading of the screw threaded cap member 46 from the housing 38.

Figure 2:
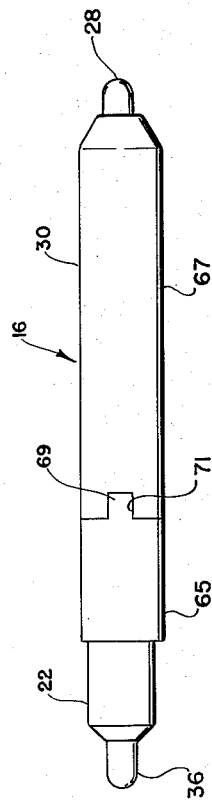
FIG. 2 shows a modified form of the electrode assembly of the invention.

FIG. 2 shows a slightly modified form of the electrode assembly 16 shown in FIG. 1 with like characters designating like parts. In the modified electrode assembly the steel sleeve 30 is cut into two members 65 and 67. The shorter, rear member 65 is fastened to the rear portion of the anode 22 by an epoxy cement or the like. The longer, forward member 67 fits into the cap member 46 (seen in FIG. 1) and is permanently secured thereto by solder. A tongue and groove arrangement, 69 and 71, between the two members 65 and 67 serves as a lock to ensure that the entire electrode assembly 16 turns with the cap member 46 when the latter is screwed into the housing 38. Thus, there is no relative motion between the forward end of sleeve 30 and the membrane 28 which could result in shearing the membrane during the screwing of cap member 46 into housing 38.

In order to electrically connect the anode and cathode of the electrode assembly 16 to an external circuit outside the subject being examined, there is provided within the rear portion of the electrode housing 38 a cylindrical conducting member 72 having a forward conical concave surface 74. The member 72 is coaxial with the platinum cathode 18 and Phosphor bronze pin 36 so that upon threading of the cap 46 into the housing 38 the pin 36 is brought into contact with member 72. A coaxial cable 76 extending through the length of the catheter 12 includes a central or inner conductor member 78 which extends into a rear recess 80 in member 72 and is electrically connected thereto by means of solder 82 or the like. An insulating sleeve 84 of Teflon or like material covers the inner conductor 78 and an outer concentric conductor 86 in the form of a double stranded spirally wound wire covers sleeve 84. As seen in FIG. 1, each convolution of the double stranded spirally wound wire abuts the next adjacent convolution thereby providing an essentially solid, highly flexible, metal sheath, surrounding the insulating sleeve 84. A forward portion 88 of the outer conductor 86 is bonded by soldering or the like to the rear portion of the housing 38. Since the housing 38 is connected to the cap member 46 which in turn contacts the sleeve 30 covering the silver anode 22, electrical contact is made between the anode and the outer conductor 86 of the coaxial cable. Epoxy potting material 90 completely fills the area in the rear portion of the housing 38 to provide electrical insulation and to concentrically align the coaxial cable 76 and member 72 with the pin 36 and the electrodes 18 and 22. A vinyl covering 92 covers the coaxial cable from the housing 38 to the rear of the catheter 12. The use of the coaxial cable is an important feature of the invention in that the spirally wound wires of the cable comprising the outer conductor 86 provide electrical shielding of the inner conductor 78 connected to the sensing electrode 18 from various electrical fields which exist in a living body and thus eliminate disturbances caused by such electrical fields which would otherwise occur.

For the catheter 12, vinyl tubing has been used for this device. The outer diameter of the tubing is only .090 inch while the inner diameter is .069 inch. The outer diameter of the housing 38 is also approximately .090 inch. Thus, the outer diameter of the instrument is of such a size as to permit the insertion of the electrochemical sensor assembly 10 and catheter 12 into the heart, arteries or veins of a living subject. The vinyl tubing also has the advantage that it expands when soaked in acetone for about 30 seconds. This provides a convenient means for obtaining a snug fit of the tubing to the electrode housing 38 since the acetone soaked tubing may be disposed over the rear portion of the housing 38 and allowed to dry whereby it shrinks back to its normal size and snugly fits on the housing. A convenient length for the catheter is 125 centimeters. This length is sufficient for use in full grown humans and permits entry into the femoral vein or artery.

Figure 3:
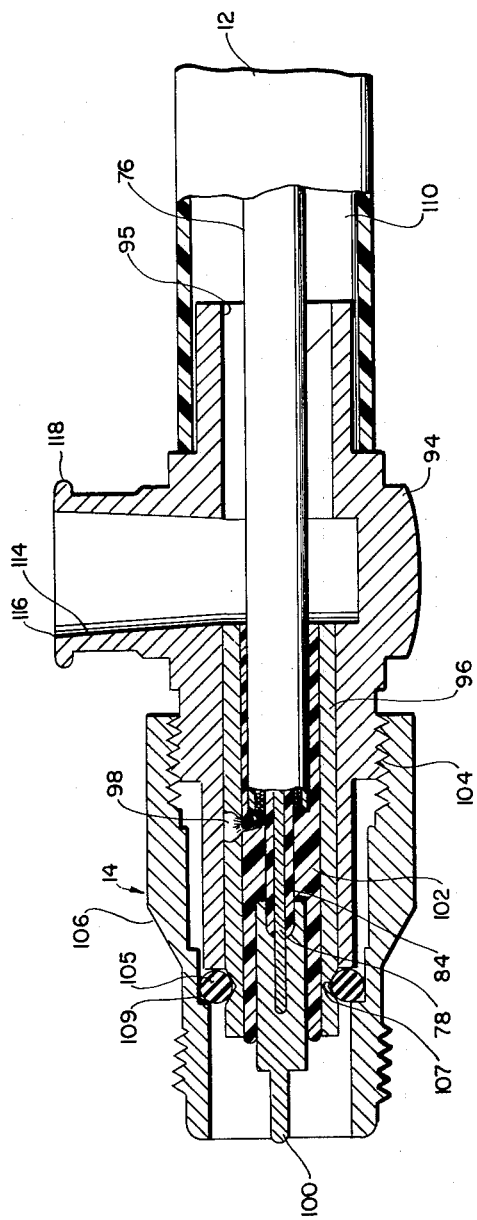
FIG. 3 is an enlarged cross sectional view of the rear portion of the catheter tubing including means for withdrawing a sample from the tubing and for connecting the tubing to an external circuit.

Referring now to FIG. 3 of the drawings, there is shown the rear portion of the catheter 12 connected to the electrical connector 14 through an additional connecting device 94 which will be explained in detail later. The coaxial cable 76 extends through an axial passage 95 in the connector 94 and the end portion thereof is disposed in an electrically conducting sleeve 96 which is connected to the outer conductor 86 of the cable as indicated at 98. The inner conductor 78 of the coaxial cable is embedded into a contact pin 100. An epoxy material 102 maintains the inner conductor 78 electrically insulated from the conducting sleeve 96. The connecting member 94 is screw threaded at 104 to receive an internally threaded sleeve 106. An O-ring 105 is positioned in a groove 107 in the outer portion of the sleeve 96 and is compressed by a shoulder 109 on sleeve 106 into sealing relationship with the connecting sleeve 106 when the latter is screw threaded on the threaded portion 104 of the connecting member 94. Thus, moisture is prevented from entering the rear portion of the device. The rear end of the sleeve 106 is adapted to receive a connecting device which will provide electrical communication between the sleeve 96 and contact pin 100 to an external polarographic electrical circuit which provides the suitable reducing potential and detects the reduction current at the electrodes 18 and 22.

Whereas the instrument described to this point provides a means for making in vivo measurements of the oxygen tension of blood in the heart, veins or arteries, on occasion it is convenient to simultaneously withdraw some of the sample or blood from the subject being examined. For this purpose, there is provided an opening 108 in the wall of the catheter 12 just behind the electrochemical sensor assembly 10 which communicates with an annular passage 110 between the inner walls of the catheter and the outer wall of the coaxial cable 76. Thus, sample fluid may pass through the opening 108 and passage 110 to the rear portion of the catheter which remains externally of the subject being examined. The walls of the passage 95 in the connecting member 94 are spaced from the coaxial cable 76 thereby permitting the fluid in passage 110 to pass to a lateral recess 114 in the connecting member 94. Fluid may then pass through the open end 116 of the recess where it may be further treated or analyzed as required. The recess 114 is adapted to receive a male member of a coupling which may be connected to a suitable instrument for making pressure measurements of the blood or body fluid being analyzed. While the spirally wound outer conductor 86 of the coaxial cable provides generally sufficient electrical shielding for the central conductor 78, the blood in the annular passage 110 in the catheter also provides shielding for the conductors 78 and 86 from the various electrical fields in the body or subject being examined.

The present invention permits in vivo measurements of the partial pressure of oxygen without withdrawal of the blood sample from the subject being treated and thus eliminates the requirements of the use of external cuvette and external temperature regulation of the blood. Furthermore, the oxygen tension of the blood may be made in any arbitrarily chosen location inside the heart, arteries and veins, and the opaqueness of the catheter and electrode assembly to X-rays enables a physician to continually observe the exact location of the end of the electrode assembly under a fluoroscope. As a result, the physician is enabled to make an immediate diagnosis upon which corrective surgery may be based. Also, since it is necessary to sterilize the catheter and electrode assembly before each catheterization, there is a possibility that the catheter tubing material will gradually deteriorate and replacement will be necessary. The present invention provides a simple means for replacing the catheter tubing, as discussed above, since it may be removed by soaking the tubing in acetone for some 30 seconds. This would permit a hospital technician to make the change without having to buy an entire assembly as described herein and without having to return the entire assembly for replacement to the manufacturer. Furthermore, if the membrane 28 of the electrode assembly is damaged, the screw threaded cap member 46 may be withdrawn from the housing 38 and a new electrode assembly could be provided in the housing.

As stated before, any suitable electrochemical sensor besides an oxygen sensor may be employed in the present invention. As for example, oxygen-reduction electrodes for chloride and quinone-quinhydrone electrodes for hydrogen-ion concentration measurements could be used provided that the membrane is permeable to the diffusing substance of interest and that appropriate electrochemical system be employed within the membrane to detect the substance, its reaction products or the effect of the diffusing substance upon the electrochemical system. For example, the detection and determination of dissolved $CO_2$ by its alteration of the pH of a suitable electrochemical system through the formation of carbonic acid could be utilized. As an alternative to the quinhydrone system, the internal electrodes for pH might consist of a pH glass electrode system. In another application, the sensing electrode may be responsive to hydrogen gas rather than oxygen by reversing the polarity of the electrodes of the system shown in the drawings and by impressing 0.4 volt rather than 0.7 volt across the electrodes.

Although the present invention has been described as being ideally suited for physiological measurements, the invention has applications for the same general use in any system where access may be limited, particularly through a tubular passage or where remote reading is desirable.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:
1. In a device for making in vivo measurements of a constituent in a body fluid or the like, the combination of:
   a catheter;
   electrochemical sensor means in one end of said catheter, said sensor means including a pair of electrodes, one of said electrodes surrounding and being concentrically mounted with respect to the other electrode and spaced therefrom, an electrolyte joining said electrodes and a membrane permeable to the constituent being measured separating said electrodes and electrolyte from the body fluid;
   first and second conductors electrically connected to said electrodes and extending through said catheter to the other end thereof, a nonconductive tube surrounding said first conductor, said second conductor comprising a wire spirally wound over said nonconducting tube to form a coil, and each convolution of said coil abutting the next adjacent convolution thereof to thereby provide highly flexible electrical shielding for said first conductor; and
   means at said other end of said catheter connected to said first and second conductors for connecting said conductors to an external circuit.
2. In a device for making in vivo measurements:
   a catheter;

electrochemical sensor means in the forward end of said catheter, said sensor means including a pair of spaced electrodes, an electrolyte joining said electrodes and a membrane permeable to the constituent being measured separating said electrodes and electrolyte from the body fluid;

first and second spaced conductors electrically connected to said electrodes and extending through said catheter to the rear end thereof, said conductors having a smaller cross sectional area than said catheter thereby defining a passage in said catheter;

means at said rear end of said catheter closing said rear end and connected to said first and second conductors for connecting said conductors to an external circuit;

the side of said catheter having an opening near the forward end thereof and behind said electrochemical sensor means; and said closing means having an opening communicating with said passage, said openings providing a path for flow of body fluid from said opening in the forward end of said catheter, through said passage, to said opening in said closing means.

3. A device as set forth in claim 2 including, in addition:

coupling means disposed in the side of said closing means and operatively associated with said rear opening adapted to be connected to a second coupling.

4. A device as set forth in claim 2 wherein one of said conductors surrounds and is concentrically mounted with respect to said other conductor and said conductors are spaced from the inner walls of said catheter.

5. In an electrochemical sensor adapted to be inserted in a catheter or the like for making in vivo measurements of a constituent in a body fluid or the like, the combination of:

a substantially cylindrical housing of electrically conducting material;

a substantially cylindrical cap member of electrically conducting material detachably mounted in said housing, said cap member having an opening in the forward end thereof;

an electrode assembly including a pair of electrodes slidably mounted in said cap member, one of said electrodes being a cylindrical hollow member surrounding the other electrode and spaced therefrom to provide an annular space, insulating means in said annular space to maintain said electrodes in spaced relationship, an electrolyte joining said electrodes and a membrane permeable to the constituent being measured disposed over the forward end of said one of said electrodes for separating said electrodes and electrolyte from the body fluid;

said cylindrical hollow electrode being in electrical contact with said cap member;

a first substantially cylindrical sleeve between said cap member and the rear portion of said one of said electrodes and being connected to said one of said electrodes;

a second substantially cylindrical sleeve between said cap member and the forward portion of said one of said electrodes and being connected to said cap member;

said second sleeve having a frustroconical forward portion bearing against the outer surface of said membrane;

means for detachably connecting said first sleeve to said second sleeve to prevent relative rotary movement between said frustroconical forward portion of said second sleeve and said membrane;

first and second elongated spaced conductors having their forward ends connected to said housing and said other electrode; and means connected to the rear ends of said first and second conductors for connecting said conductors to an external circuit.

6. A device as set forth in claim 1 wherein said second conductor includes a second wire spirally wound over said coil to form a second coil layer and each convolution of said second coil abutting the next adjacent convolution thereof.

References Cited by the Examiner
UNITED STATES PATENTS

| | | | |
|---|---|---|---|
| 2,637,316 | 5/1953 | Grez | 128—2.1 |
| 2,755,243 | 7/1956 | Beckman et al. | 204—195 |
| 3,060,923 | 10/1962 | Reiner | 128—2.1 |
| 3,098,813 | 7/1963 | Beebe et al. | 204—195 |

OTHER REFERENCES

Harris, pages 962–964 of Surgery, June 1960.

RICHARD A. GAUDET, *Primary Examiner.*

SIMON BRODER, *Examiner.*